Nov. 20, 1956  J. H. KING ET AL  2,771,502
SPLICE CLOSURE FOR SHEATHED CABLE
Filed May 10, 1951  4 Sheets-Sheet 1
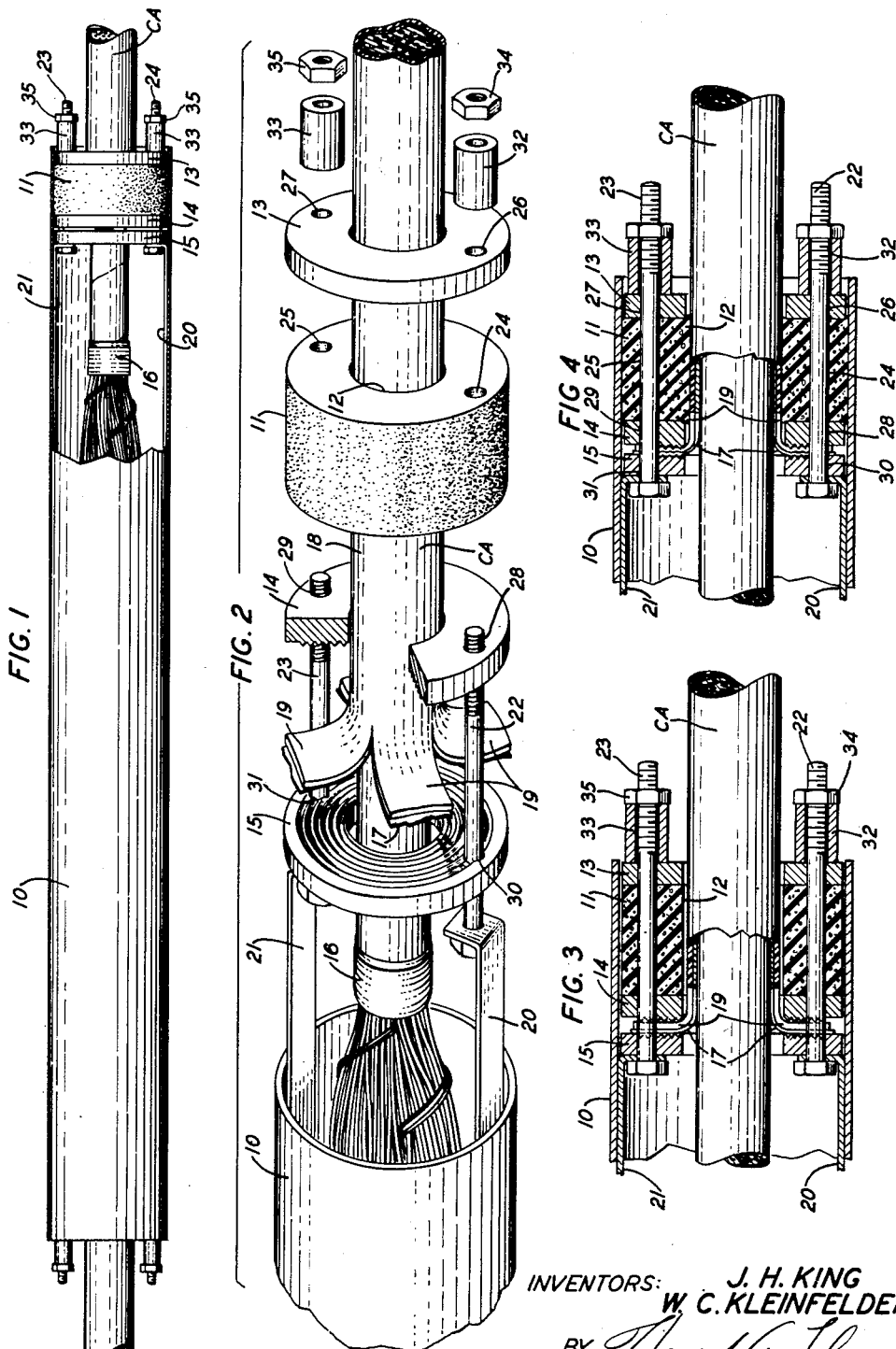
INVENTORS: J. H. KING
W. C. KLEINFELDER
BY
ATTORNEY Nov. 20, 1956 J. H. KING ET AL 2,771,502
SPLICE CLOSURE FOR SHEATHED CABLE
Filed May 10, 1951 4 Sheets-Sheet 2
INVENTORS: J. H. KING
W. C. KLEINFELDER
BY
ATTORNEY
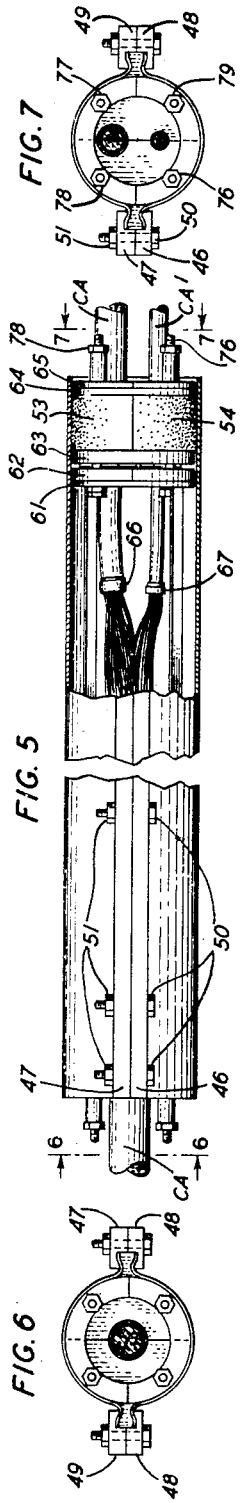

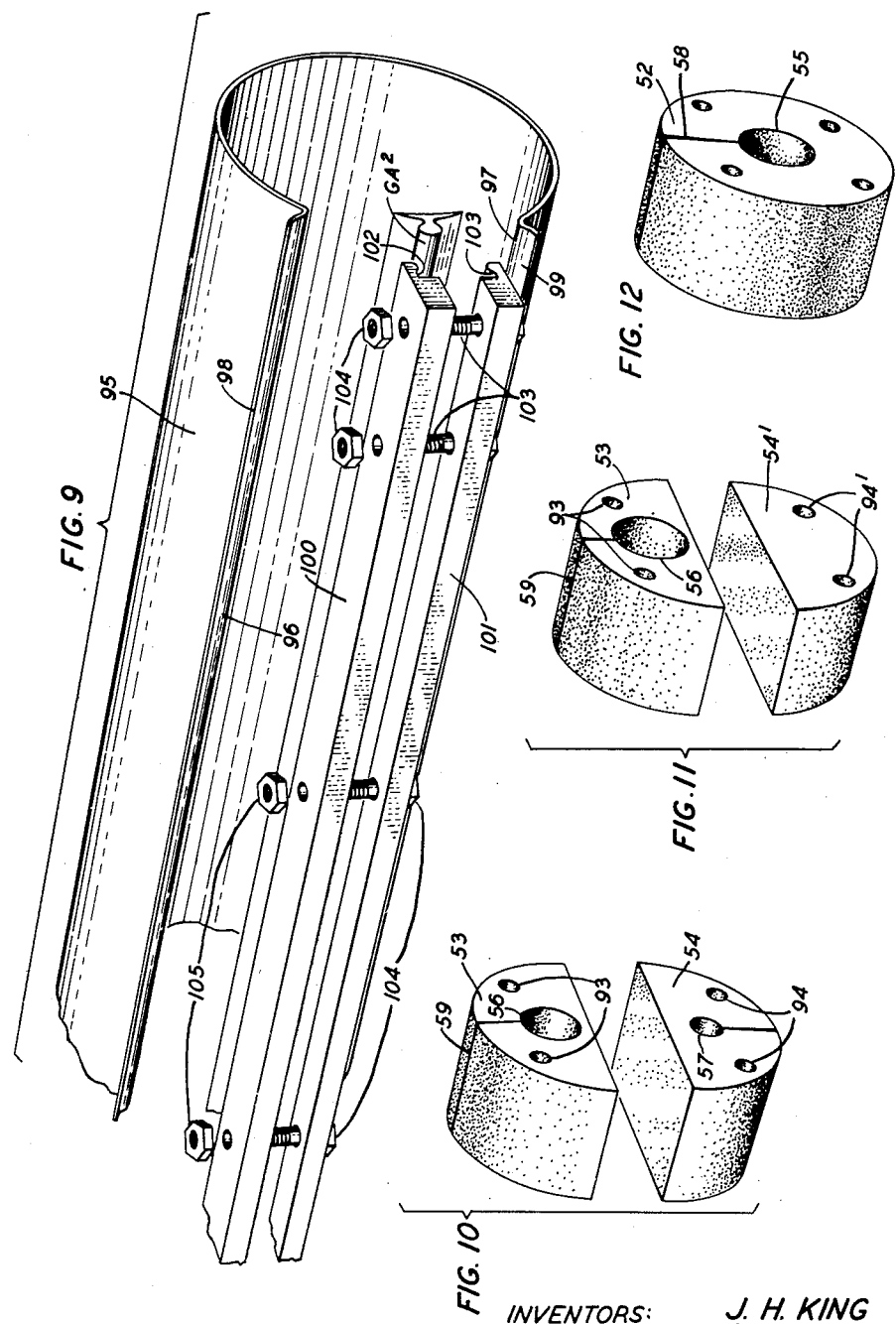

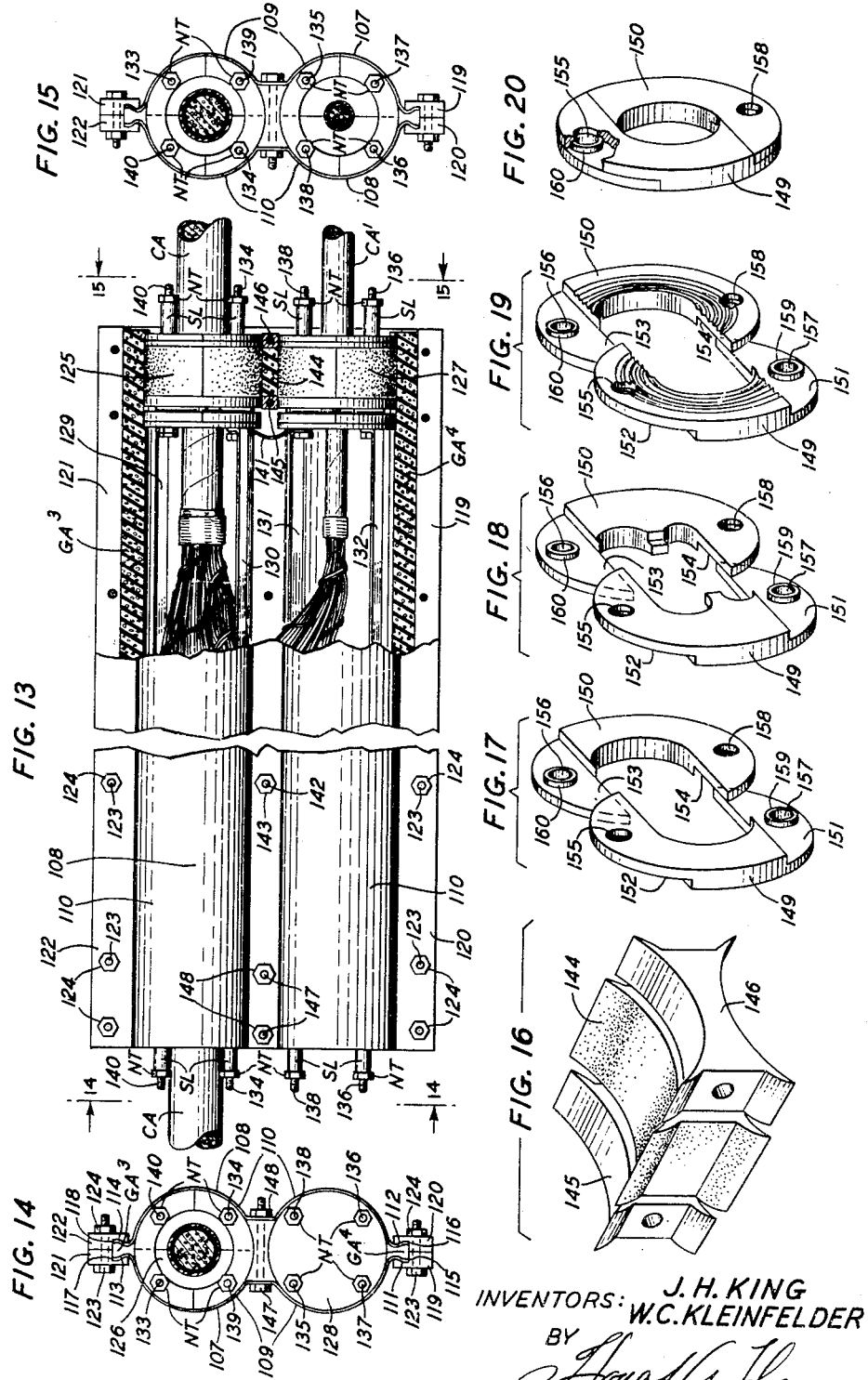

United States Patent Office 2,771,502
Patented Nov. 20, 1956

2,771,502

SPLICE CLOSURE FOR SHEATHED CABLE

John H. King, Chatham, and Walter C. Kleinfelder, Summit, N. J., assignors to Bell Telephone Laboratories, Incorporated, New York, N. Y., a corporation of New York Application May 10, 1951, Serial No. 225,576

15 Claims. (Cl. 174—92)

This invention relates to joints or splices for electrical cable and, more particularly, to a mechanical splice closure or case for joints in multiconductor sheathed cable.

One object of the invention is the provision of a mechanical splice closure or case for joints in thermoplastic or lead sheathed cable which protects the cable joint from the elements and is substantially gas-tight.

Another object of the invention is the provision of a splice closure or case which comprises a relatively few number of parts, is mechanically as strong as the cable itself and provides electrical continuity through the metallic layer of the cable sheath through the joint without increasing the resistance thereof.

A further object of the invention is the provision of a splice closure or case which may be applied over an existing joint in an unbroken length of cable or applied to a new joint where the ends are free.

A still further object of the invention is the provision of a splice closure or case which will accommodate various sizes of cable.

A still further object of the invention is the provision of a splice closure or case which permits a branch or secondary cable to be spliced to the main cable and brought out therefrom.

Cables to which this closure or splice case is particularly adaptable comprise a plurality of insulated conductors having a jacket of insulating material wrapped therearound, a thin metallic sheath surrounding the insulating jacket and a sheath of thermoplastic enclosing the whole.

The invention embraces a method and means for making joints or splices in multiconductor cable of the heretofore-mentioned type. Devices constructed in accordance therewith comprise a mechanical closure or case constructed of steel, plastic or other suitable strong material which is adapted to surround the cable joint and be sealed at the ends thereof. The seals at the ends of the splice case or closure comprise resilient, e. g. rubber, bushings which surround the cable sheath and are forced into intimate gas-tight contacts with the sheath of the cable and the interior wall of the case, by washers on each side of the bushings which when forced toward each other compress the bushings around the cable and force them into intimate contact with the interior wall of the splice case.

In order to provide mechanical strength and to assure the electrical continuity of the cable sheath, the ends of the sheath which, in some instances, may be of metal or metal and plastic, are split longitudinally a short distance, peeled back and clamped between suitable washers on the inner side of the end seals. The seal assemblies in each end of the case are joined together by longitudinally extending metallic rods on the interior of the case. These rods extend the length of the splice case and are secured under the heads of the bolts which secure the end seal assemblies together, thereby providing a good electrical contact between the rods and the washers which grip the metallic sheath layer.

In order to accommodate various types of splices and branch circuits, for example, splices which are known as Y type, suitable interchangeable bushings having various sizes of apertures therein are provided.

To enable the mechanical splice closure of this invention to be used on existing cable wherein the cable length is unbroken, the housing is split longitudinally to permit its application to the cable sheath; also the associated bushings and washers are split to permit them to be readily applied to the cable.

The invention will be more clearly understood from the following detailed description when read in connection with the following drawings, of which:

Fig. 1 is an elevational view of the splice case of this invention in place on a portion of cable with a portion of the case broken away to disclose the end structure.

Fig. 2 is an enlarged fragmentary exploded view, in perspective, of one end of the splice case and discloses the parts associated therewith;

Fig. 3 is a fragmentary view, partly in section, of one of the end seals before it has been compressed around the cable and expanded into contact with the interior of the splice case;

Fig. 4 is a view similar to Fig. 3 but showing the rubber bushing of the seal compressed so that it is in intimate engagement with the exterior of the cable sheath and the interior of the metal splice case;

Fig. 5 is an elevational view partly in section of a two-piece splice case adapted to be fitted over an unbroken length of cable and incorporating a branch cable connection therein;

Fig. 6 is an end view taken on line 6—6 of Fig. 5;

Fig. 7 is an end view taken on line 7—7 of Fig. 5;

Fig. 8 is a fragmentary exploded view in perspective, and shows the associated parts of the two-piece splice case shown in Fig. 5;

Fig. 9 is a perspective view of another splice case cover for use with an unbroken length of cable;

Figs. 10, 11 and 12 are perspective views of resilient bushings adapted to be used in the splice closure shown in Figs. 5 and 8;

Fig. 13 is an elevational view, with parts broken away of another two-piece splice case which employs a housing having a substantially 8-shaped cross section and shows a branch cable being brought out therefrom;

Fig. 14 is an end view taken on line 14—14 of Fig. 13;

Fig. 15 is an end view taken on line 15—15 of Fig. 13;

Fig. 16 is an enlarged perspective view of the spacing members which seal the space between ends of the splice case shown in Fig. 13;

Fig. 17 is an exploded perspective view of a modified type of washer having one aperture therein and adapted to be used with the splice cases disclosed in Figs. 5 and 8;

Fig. 18 is an exploded perspective view similar to Fig. 17 except that the washer is provided with two apertures;

Fig. 19 is an exploded perspective view similar to Fig. 17 but disclosing a modified type of clamping washer having concentric embossings for use with the splice case shown in Figs. 5 and 8; and Fig. 20 is an assembly view with a portion broken away of the washer shown in Fig. 17.

In one form of our invention, which is intended to be used where the ends of the cable are free and wherein the splice case may be positioned on the cable prior to making the joint, we provide a structure, as shown in Figs. 1 to 4, inclusive. This structure comprises an elongated cylindrical casing 10 which may be constructed of steel, plastic or any suitable strong material having positioned at each end thereof suitable means for sealing the ends of the casing to prevent the leakage of gas and to prevent the entrance of moisture either around the cable or between the casing and the seal.

Located at each end of the casing 10 is a seal assembly, which, as shown in Figs. 1 to 4, comprises a resilient compressible bushing 11, which may be of rubber or other suitable material and having an aperture 12 therein for the passage of a cable CA therethrough. The diameter of the bushing 11 is such that it slidably fits the interior of the casing 10 and may be readily positioned therein, as shown in Fig. 3. The bushing 11 is flanked on each side by the metal washers 13 and 14 which are adapted to embrace the bushing and exert pressure thereon. Located adjacent the middle washer 14, which has a series of concentric indentations on the surface away from the bushing 11, is a third or inner washer 15, which also has a series of concentric indentations thereon adapted to engage the indentations on the washer 14 to provide a pair of jaw-like clamping members.

As shown in Figs. 1 to 4, the conductors in the cable CA have been spliced in the well-known manner and wrapped with a serving of tape 16 over the underlying layer of insulation and the sheath of the cable CA, which is composite in construction and comprises a layer of conducting material 17 and an outer covering of thermoplastic material 18 which has been longitudinally split and peeled back to provide the tabs 19.

In assembling the seal of this invention and to mechanically secure the ends of the cable sheath together, to form a strong mechanical joint, the tabs 19, with their exposed metal portions 17, and firmly clamped between the washers 14 and 15, as shown in Figs. 1 and 4. Not only does the clamping of the cable sheath tabs 19 between the washers 14 and 15 provide a strong mechanical connection for the cable sheath, but it also provides an electrical connection to the metallic sheath of the cable which is unbroken due to the longitudinally extending rods 20 and 21 which are connected to the metal washers 14 and 15 by means of the bolts 22 and 23. Since a structure of this type is located on the inner side of each seal located on each end of the casing 10 and since the rods 20 and 21 are connected thereto and bridge the cable splice, the electrical continuity of the metal sheath will not be interrupted.

As shown, the bushing 11 is provided with diametrically opposed apertures 24 and 25 and the washers 13, 14 and 15 are also provided with diametrically opposed apertures 26, 27, 28, 29, 30 and 31. All of these apertures are in alignment and are arranged to receive the bolts 22 and 23 which pass therethrough and provide an assembly, as shown in Fig. 3. As heretofore referred to with regard to the longitudinally extending conducting straps or rods 20 and 21, the bolts 22 and 23 pass through the bent over portions on the ends of these rods and also through the bushing 11 and the washers 13, 14 and 15, as shown in the various figures.

After the cable CA has been spliced and tape served, as heretofore described, the bushing 11 and the associated washers 13, 14 and 15, which have been previously positioned over the cable, are assembled on the bolts 22 and 23 with the sleeves 32 and 33 interposed between the outer face of the washer 13 and the nuts 34 and 35. When this operation is completed, the casing 10 which also has been previously positioned over the cable, is slid over the assembly, as shown in Fig. 3, and the seal is ready to be secured in position.

After the casing 10 has been positioned over the seal, as shown in Fig. 3, the nuts 34 and 35 are tightened. This causes the washers 14 and 15 to move toward each other to firmly grip the tabs 19 of the cable CA therebetween. This action also causes the outer washer 13 to be forced against the outer surface of the bushing 11, and, since the bushing 11 is confined between the outer washer 13 and the middle washer 14, the pressure exerted thereon will cause the bushing 11 to constrict around the cable CA and expand into intimate contact with the inner wall of the casing 10, as shown in Fig. 4, thereby providing a gas and water-tight seal between the cable CA and the casing 10.

In those instances wherein the splice to be protected is located in a continuous or unbroken length of cable and the casing or closure must be applied thereover, the casing, therefore, of necessity, must be separable to permit its application; likewise, the component parts which form parts of the splice closure must also be capable of being applied to the unbroken length of cable.

As shown in Figs. 5, 6, 7 and 8, there is shown one form of splice case or closure which is so constructed that it may be readily applied to an unbroken length of cable CA and will provide the same degree of protection and be fully as gas-tight as the tubular closure or casing shown in Figs. 1 to 4. In Figs. 5, 6, 7 and 8, there is also shown a branch or secondary cable CA' being brought out from the main cable CA. However, this structure, that is, of a branch cable, may be omitted from this closure and may comprise a single splice closure, as shown in Figs. 1 to 4, or, on the other hand, it may be included in the splice closure shown in Figs. 1 to 4 by using suitable bushings and washers having the required number of apertures therein.

The splice closure or casing, as shown in Figs. 5 to 8, comprises a pair of mating elongated trough-shaped members 36 and 37 which are of semicircular configuration and are provided along their extending edges with lip portions 38, 39, 40 and 41. These lip portions extend outwardly at an angle from the body members and are adapted to be clamped in the grooves 42, 43, 44 and 45 of the longitudinally extending jaw members 46, 47, 48 and 49, as shown in detail in Figs. 6 and 7, by means of the bolts 50 and the associated nuts 51. In order to provide a gas-tight and water-tight seal between the meeting edges of the members 36 and 37, a pair of gaskets GA and GA', of tough resilient material, having a raised central bead portion and feathered edges, as shown in Fig. 8, are interposed between the lips 38, 39, 40 and 41 at the time the jaws 46, 47, 48 and 49 are clamped in place, thereby providing a casing having a substantially circular cross section, as shown in Figs. 5, 6 and 7, which is gas and water-tight along its seams.

Located in each end of the casing which comprises the mating halves 36 and 37, which are secured together to form the cylindrical casing, is a seal assembly as shown in Fig. 5 and, more in detail, in Fig. 8.

Each seal assembly, as shown, may comprise a circular bushing 52, as shown in Fig. 12, wherein a single cable is to be accommodated or, as shown in Fig. 8, it may comprise a pair of semicircular bushings 53 and 54, as shown in Fig. 8 and, more in detail, in Figs. 10 and 11. These bushings may be of rubber or any other suitable tough resilient material and are provided with apertures 55, 56 and 57 therein for the reception of the cable CA and CA'. These bushings are provided with radial slits 58, 59 and 60 which communicate with the apertures 55, 56 and 57 and with the peripheries of the bushings, thereby permitting the bushings to be readily positioned on the cables since the cables CA and CA' being unbroken, the bushings and component parts cannot be threaded thereon as in the case of the structure heretofore described with reference to Figs. 1 and 4.

When the bushing 52, as shown in Fig. 12, or the two mating halves 53 and 54 of the bushing shown in Figs. 8, 10 and 11 are positioned over the cable, as shown, their diameters are such that they will slidably fit into the interior of the casing and may be readily positioned therein. With reference to Figs. 5 and 8, the bushings 53 and 54 are flanked on the inner side by a series of split metallic washers 61, 62 and 63 and on the outer side by the split metallic washers 64 and 65. These washers, when assembled as shown, are adapted to embrace the bushing halves 53 and 54 or the bushing 52, as the case may be, when pressure is exerted thereon.

The washers and the bushings employed in the structure shown in Figs. 5 to 8 are similar to the washers and bushings used in the structure of Figs. 1 to 4, except that they are radially split to permit their ready application to the cable. However, since the washers 61, 62, 63, 64 and 65 are split, it is necessary for strength and rigidity that the washers be composite in structure, that is, that they should comprise two layers with their joints offset with respect to each other at approximately 90 degrees. The washers 62 and 63 are provided on their meeting faces with a plurality of concentric embossings to provide a pair of jaw-like clamping members. Like the structure described heretofore with reference to Figs. 1 to 4, the cable CA has been spliced together in the well-known manner and, in addition, a branch cable CA' has been brought out therefrom. Suitable tape servings 66 and 67 have been applied over the underlying layer of insulation of the cables CA and CA' to bind them firmly in place. The sheaths of the cables CA and CA' comprise a layer of conducting material 68 and 69 and an outer covering of thermoplastic insulating material 70 and 71 and have been longitudinally split and peeled back to provide the tabs 72—72 and 73—73. The procedure of assembling this seal is substantially the same as that heretofore described with reference to the closure or casing shown in Figs. 1 to 4, except that there are more parts involved due to the use of split composite type washers. Like the structure heretofore described with reference to Figs. 1 to 4, the ends or tabs 72—72 and 73—73, with their exposed metallic sheath portions, are firmly clamped between the embossings on the washers 62 and 63 to provide a strong mechanical joint and to make a suitable electrical connection thereto. By the use of longitudinally extending straps or rods 74 and 75, which extend the length of the casing, bridge the splice and are connected to the bolts 76 and 77 of the seals on each end of the casing, the electrical continuity of the cable sheath is unbroken.

As shown, the bushing halves 53 and 54 are provided with apertures 93—93 and 94—94, and the washers 61, 62, 63, 64 and 65 are provided with diametrically opposed aligned apertures 80—80, 81—81, 82—82, 83—83 and 84—84 through which the bolts 76, 77, 78 and 79 pass to provide an assembly, as shown in Fig. 5. As heretofore described, the conducting straps 74 and 75 are secured over the heads of the bolts 76 and 77, thereby providing an electrical circuit through the washers to the metal cable sheath clamped between the washers 62 and 63.

After the cables CA and CA' have been spliced and tape served, as shown, the bushing halves 53 and 54, and the washers 61, 62, 63, 64 and 65 are positioned over the cable CA and CA' in their proper positions, as shown in Fig. 8, with the bolts 76, 77, 78 and 79 passing therethrough with the sleeves 85, 86, 87 and 88 positioned over the protruding ends of the bolts with the nuts 89, 90, 91 and 92 in engagement with the threaded ends of the bolts.

After the above operation has been completed, the closure or casing is positioned over the splice and the seal assemblies are positioned on the ends of the casing, as shown in Fig. 5. The nuts 89, 90, 91 and 92 on the bolts 76, 77, 78 and 79 are tightened to force the washers in the assembly toward each other.

This causes the washers 62 and 63 to firmly grip the tabs 72—72 and 73—73 of the cables CA and CA' therebetween. The further tightening of the nuts 89, 90, 91 and 92 causes the bushing halves 53 and 54 to be compressed between the washer assembly, and since the bushing halves are confined between the washers, the pressure exerted thereon will cause the bushing halves to constrict around the cables CA and CA' and also to expand into intimate contact with the inner wall of the two casing halves 36 and 37, as shown in Fig. 5, thereby providing a gas and water-tight seal between the cables CA and CA' and the casing 10.

In those instances where it is desirable to bring out a single cable from the casing or closure, a bushing, as shown in Fig. 11, which comprises two similar halves, one which may be the half 53 as heretofore described and the lower half 54' being of solid construction but having bolt apertures 94' therein, is shown.

In Fig. 9 there is illustrated a type of casing which comprises a longitudinally extending member 95 slit longitudinally to provide the edge portions 96 and 97. As is shown, these edge portions are bent back upon themselves to form the extending lips 98 and 99. This structure provides a substantially cylindrical casing or closure for use with the seals heretofore described and is secured along its edges by means of a pair of longitudinally extending clamping jaws 100 and 101 which are provided with suitable grooves 102 and 103 in which the lips 97 and 98 are adapted to be positioned. Suitable bolts 103 and associated nuts 104 serve to hold the clamping jaws 100 and 101 in firm engagement with the extending lips 99 and 100. In order to assure that the longitudinal extending seam of this casing or closure is gas and watertight, a suitable gasket $GA^2$ having a central upstanding bead and feathered edges is interposed between the two meeting lips 98 and 99 before the jaws 100 and 101 are tightened down into position. The structure of the clamping device is substantially the same as the clamping device used on the closure shown in Figs. 5 to 8 except that, in this modification, the casing comprises one piece of material and utilizes only one pair of clamping devices. While it is intended that this type of casing be employed with unbroken lengths of cable, it is obvious that it could be used where the ends of the cable are broken and could be used interchangeably with either of the casings shown in Figs. 1 to 4, inclusive, or 5 to 8, inclusive.

In Figs. 13, 14 and 15, there is shown a modified type of splice case or closure similar to the cases shown in Figs. 5 and 9 and which, like the cases heretofore described in connection with said figures, is intended to be employed on an unbroken length of cable and employs the same type of sealing assemblies at each end of the casings, which may employ either completely circular bushings, as shown in Figs. 12 and 13, or it may employ semicircular bushings, as shown in Figs. 8, 10 and 11.

The casing or housing for the splice closure shown in Figs. 13, 14 and 15 comprises two mating halves 107 and 108 each of which are of like configuration and are provided with a pair of longitudinally extending parallel semicircular troughs 109—109 and 110—110. The casing members 107 and 108 are provided along their free edges with lip portions 111, 112, 113 and 114 which extend outwardly at an angle from the members 107 and 108 and are adapted to be clamped in the grooves 115, 116, 117 and 118 of the longitudinally extending jaw members 119, 120, 121 and 122, as shown in detail in Figs. 14 and 15, by means of the bolts 123 and the nuts 124. In order to provide a gas and water-tight seal between the meeting edges of the members 107 and 108, a pair of gaskets $GA^3$ and $GA^4$ of tough resilient material, having a raised central bead portion and feathered edges, as shown in Figs. 14 and 15, are interposed between the lips 111, 112, 113 and 114 at the time the jaw members 119, 121 and 122 are clamped in place, thereby providing a casing or housing having a pair of parallel substantially semicircular chambers which communicate with each other.

Located in each end of the chambers, formed by the casing halves 107 and 108, as shown in Figs. 13, 14 and 15, are sealing assemblies which are substantially the same as the sealing assemblies heretofore described with reference to Figs. 1 to 9, inclusive, and may comprise semicircular portions, as shown at 125, 126 and 127 in Figs. 13, 14 and 15 and also in Figs. 10 and 11, or may comprise completely circular portions, as shown in Fig. 12. Both of these types of bushings are provided with suitable apertures and radial slits, as heretofore described, to permit their ready application to the cable. When it is desirable to close one end of the casing or closure completely, as shown in Fig. 14, a plug 128 is employed.

Like the casings previously described, the electrical continuity of the cable sheath is maintained by means of suitable rods or straps 129, 130, 131 and 132 which extend the length of the casing and bridge the cable splice. These straps are secured under the heads of the bolts 133, 134, 135 and 136 of the seal assembly, which also employs, as heretofore described, additional bolts 137, 138, 139 and 140 and the spacing sleeves SL and the nuts NT to actuate the seal assembly to make it gas and watertight by compressing the resilient bushing between suitable washers, as heretofore described, to constrict the bushing around the cable positioned in the aperture in the bushings and to expand the bushing into intimate contact with the inner walls of the chambers. In order to establish an electrical connection between the metal sheath of the branch cable CA', and the main cable CA, as shown in Fig. 13, a strap 141 is secured under the heads of the bolts 134 and 138.

As shown in Figs. 13, 14 and 15, the two casing halves 107 and 108, which make up the closure casing, are secured together along their mid section by means of the bolts 142 and the nuts 143. In order to provide a seal at the ends of the casing between the bushings 125 and 127, arcuate shaped resilient spacing members 144, flanked by metal arcuate members 145 and 146, as shown in section in Fig. 13 and more in detail in Fig. 16, are positioned between the seals at the end of the casing and held in place by means of suitable bolts 147 and nuts 148.

In Figs. 17, 18, 19 and 20, there is illustrated a modified type of washer structure which may be used with any of the closures heretofore shown and described but is intended preferably for use with the closures shown in Figs. 8 and 13 which are intended to be used with an unbroken length of cable. The modified washers, as shown, are also of the composite type and comprise two similar bifurcated mating halves which, when fitted together, provide a circular washer having a central aperture or apertures.

As shown in these figures, the mating halves are of like configuration and comprise two arcuate shaped bifurcated members 149 and 150 having stepped portions 151, 152, 153 and 154 on their meeting faces which engage with each other to provide a structure of substantially uniform thickness. The members 149 and 150 are provided with apertures 155, 156, 157 and 158, which when the members 149 and 150 are assembled, as shown in Fig. 20, are in alignment and permit the reception of the bolts used for assembling the seal heretofore described. Since the construction of these washers provides a strong interlocking rigid structure, it is only necessary to employ two bolts and the extra parts together with the extra bolts used in the heretofore composite washers, which comprise segmental parts, may be dispensed with. In order to prevent the displacement of the members 149 and 150 during the assembly of these washers, one aperture on each member is provided on its inner face with an embossed ridge, as shown at 159 and 160. These ridges are adapted to engage the counterbored portions of the two other apertures 155 and 158 on the inner faces of the members 149 and 150, as shown in detail in Fig. 20.

The structure of the washer shown in Fig. 18 is substantially the same as the structure heretofore described with reference to Fig. 17 except that the central opening is constructed to accommodate two cables.

The structure of the washer shown in Fig. 19 is substantially the same as the washer shown in Figs. 17 and 20 except that, in this instance, the washer is provided on its face with a plurality of concentric embossings 161.

While we have shown and described the preferred embodiment of our invention, it is to be understood that various changes and modifications may be made therein without departing from the scope and spirit of the invention.

What is claimed is:

1. A splice closure for joints in sheathed cable and the like comprising an elongated housing, a cable confined in said housing and extending from each end thereof, the sheath of the confined cable, adjacent the ends of said housing, slit longitudinally to provide outwardly extending tab portions, clamping means in the ends of said housing for gripping therebetween said tab portions, means in the ends of said housing comprising resilient bushings, for sealing the ends thereof and means passing through said clamping means and said bushings for simultaneously causing the deformation of said bushings and the compression of said clamping means.

2. A splice closure for joints in sheathed cable and the like comprising an elongated housing, a cable confined in said housing and extending from each end thereof, the sheath of the confined cable, adjacent the ends of said housing, slit longitudinally to provide outwardly extending tab portions, a pair of clamping rings in each end of said housing for gripping therebetween said tab portions, means in the ends of said housing comprising resilient bushings for sealing the ends thereof and means passing through said clamping rings and said bushings for simultaneously causing the deformation of said bushings and the compression of said clamping rings.

3. A splice closure for joints in sheathed cable and the like comprising an elongated housing, a cable confined in said housing and extending from each end thereof, the sheath of the confined cable, adjacent the ends of said housing, slit longitudinally to provide outwardly extending tab portions, clamping means in the ends of said housing for gripping therebetween said tab portions, means in the ends of said housing comprising resilient bushings, for sealing the ends thereof and longitudinally extending bolts passing through said clamping means and said bushings for simultaneously causing the deformation of said sealing means and the compression of said clamping rings.

4. A splice closure for joints in sheathed cable and the like comprising an elongated tubular housing, a cable confined in said tubular housing and extending from each end thereof, the sheath of the confined cable, adjacent the ends of said housing, slit longitudinally to provide outwardly extending tab portions, clamping means in the ends of said tubular housing for gripping therebetween said tab portions, means in the ends of said tubular housing comprising resilient bushings, for sealing the ends thereof and means passing through said clamping means and said bushings for simultaneously causing the deformation of said bushings and the compression of said clamping means.

5. A splice closure for joints in sheathed cable and the like comprising an elongated tubular housing, a cable confined in said tubular housing and extending from each end thereof, the sheath of the confined cable, adjacent the ends of said housing, slit longitudinally to provide outwardly extending tab portions, a pair of clamping rings in each end of said tubular housing for gripping therebetween said tab portions, means in the ends of said tubular housing comprising resilient bushings for sealing the ends thereof and means passing through said clamping rings and said bushings for simultaneously causing the deformation of said bushings and the compression of said clamping rings.

6. A splice closure for joints in sheathed cable and the like comprising a pair of longitudinally extending trough-shaped members having projecting lip portions along their marginal edges, clamping means embracing the lips for joining them together to provide a substantially tubular-shaped housing, a cable confined in said housing and extending from each end thereof, the sheath of the confined cable, adjacent the ends of said housing, slit longitudinally to provide outwardly extending tab portions, clamping means in the ends of said housing for gripping therebetween said tab portions, means in the ends of said housing comprising resilient bushings, for sealing the ends thereof and means passing through said clamping means and said resilient bushings for simultaneously causing the deformation of said bushings and the compression of said clamping means.

7. A splice closure for joints in sheathed cable and the like comprising a pair of longitudinally extending trough-shaped members having projecting lip portions along their marginal edges, clamping members embracing the lips for joining them together to provide a substantially tubular housing, a cable confined in said housing and extending from each end thereof, the sheath of the confined cable, adjacent the ends of said housing, slit longitudinally to provide outwardly extending tab portions, a pair of clamping rings in each end of said housing for gripping therebetween said tab portions, means in the ends of said housing comprising resilient bushings for sealing the ends thereof and means passing through said clamping rings and said resilient bushings for simultaneously causing the deformation of said bushings and the compression of said clamping rings.

8. A splice closure for joints in sheathed cable and the like comprising a pair of longitudinally extending trough-shaped members having projecting lip portions along their marginal edges, clamping members embracing the lips for joining them together to provide a substantially tubular housing, a cable confined in said housing and extending from each end thereof, the sheath of the confined cable, adjacent the ends of said housing, slit longitudinally to provide outwardly extending tab portions, clamping means comprising a pair of washers disposed at right angles with respect to the axis of the cable, and having indentations in their opposing faces, positioned in the ends of said housing for gripping therebetween said tab portions, means in the ends of said housing comprising resilient bushings, for sealing the ends thereof and means passing through said clamping washers and said resilient bushings for simultaneously causing the deformation of said bushings and the compression of said clamping washers.

9. A splice closure for joints in sheathed cable and the like comprising a pair of longitudinally extending trough-shaped members having projecting lip portions along their marginal edges, clamping members embracing the lips for joining them together to provide a substantially tubular housing, a compressible gasket between the meeting surfaces of the lips, a cable confined in said housing and extending from each end thereof, the sheath of the confined cable, adjacent the ends of said housing, slit longitudinally to provide outwardly extending tab portions, a pair of oppositely disposed clamping washers positioned at right angles with respect to the axis of the cable and having indentations in their opposing faces, positioned in each end of said housing for gripping therebetween said tab portions, means in the ends of said housing comprising resilient bushings for sealing the ends thereof and means passing through said clamping washers and said resilient bushings for simultaneously causing the deformation of said bushings and the compression of said washers.

10. A splice closure for joints in sheathed cable and the like comprising a pair of longitudinally extending trough-shaped members, having projecting lip portions along their marginal edges, longitudinally grooved clamping members embracing the lips for joining them together to provide a substantially tubular housing, a compressible gasket positioned between the meeting surfaces of the lips, a cable confined in said housing and extending from each end thereof, the sheath of the confined cable, adjacent the ends of said housing, slit longitudinally to provide outwardly extending tab portions, a pair of oppositely disposed clamping washers positioned at right angles with respect to the axis of the cable, and having indentations in their opposing faces, positioned in each end of said housing for gripping therebetween said tab portions, means in the ends of said housing comprising resilient bushings, for sealing the ends thereof and longitudinally extending bolts passing through said clamping washers and said resilient bushings for simultaneously causing the deformation of said bushings and the compression of said clamping washers.

11. A splice closure for joints in sheathed cable and the like comprising an elongated one-piece tubular housing split longitudinally to provide spaced apart opposed edges and having extending lip portions along the marginal edges thereof, clamping means embracing said lip portions for securing said edges together, a cable confined in said housing and extending from each end thereof, the sheath of the confined cable, adjacent the ends of said housing, slit longitudinally to provide outwardly extending tab portions, clamping means in the ends of said housing for gripping therebetween said tab portions, means in the ends of said housing comprising resilient bushings for sealing the ends thereof and longitudinally extending bolts passing through said second clamping means and said resilient bushings for simultaneously causing the deformation of said resilient bushings and the compression of said clamping means.

12. A splice closure for joints in sheathed cable and the like comprising an elongated one-piece tubular housing split longitudinally to provide spaced apart opposed edges and having extending lip portions along the marginal edges thereof, clamping means embracing said lip portions for securing said edges together, a cable confined in said housing and extending from each end thereof, the sheath of the confined cable, adjacent the ends of said housing, slit longitudinally to provide outwardly extending tab portions, a pair of clamping rings in each end of said housing for gripping therebetween said tab portions, means in the ends of said housing comprising resilient bushings for sealing the ends thereof, and longitudinally extending bolts passing through said clamping rings and said resilient bushings for simultaneously causing the deformation of said resilient bushings and the compression of said clamping rings.

13. A splice closure for joints in sheathed cable and the like comprising an elongated one-piece tubular housing split longitudinally to provide spaced apart opposed edges and having extending lip portions along the marginal edges thereof, clamping means embracing said lip portions for securing said edges together, compressible means positioned between said clamping members and embraced by said lip portions, a cable confined in said housing and extending from each end thereof, the sheath of the confined cable, adjacent the ends of said housing, slit longitudinally to provide outwardly extending tab portions, a pair of clamping rings in each end of said housing for gripping therebetween said tab portions, means in the ends of said housing comprising resilient bushings for sealing the ends thereof, and longitudinally extending bolts passing through said clamping rings and said resilient bushings for simultaneously causing the deformation of said resilient bushings and the compression of said clamping rings.

14. A splice closure for joints in sheathed cable and the like comprising an elongated housing defined by a pair of members each having a plurality of longitudinally extending, substantially trough-shaped depressions therein and having extending lip portions along their marginal edges, clamping members embracing said marginal edges for joining said elongated members together to provide a housing having a plurality of parallel tubular bores, a cable confined in said housing and extending from each end thereof, the sheath of the confined cable, adjacent the ends of said housing, slit longitudinally to provide extending tab portions, clamping means in the ends of said housing for gripping therebetween said tab portions, means in the ends of said housing comprising resilient bushings for sealing the ends thereof, and means passing through said clamping means and said bushings for simultaneously causing the deformation of said resilient bushings and the compression of said clamping means.

15. A splice closure for joints in sheathed cable and the like comprising an elongated housing defined by a pair of members each having a plurality of longitudinally extending, substantially trough-shaped depressions therein, and having extending lip portions along their marginal edges, clamping members embracing said marginal edges for joining said elongated members together to provide a housing having a plurality of parallel tubular bores, resilient means positioned between said clamping members and embraced by said lip portions, a cable confined in said housing and extending from each end thereof, the sheath of the confined cable, adjacent the ends of said housing, slit longitudinally to provide extending tab portions, a pair of clamping rings in each end of said housing for gripping therebetween said tab portions, means in the ends of said housing comprising resilient bushings for sealing the ends thereof, and longitudinally extending bolts passing through said clamping rings and said bushings for simultaneously causing the deformation of said resilient bushings and the compression of said clamping rings.

References Cited in the file of this patent

UNITED STATES PATENTS

| | | |
|---|---|---|
| 990,234 | Davis | Apr. 25, 1911 |
| 1,497,002 | Sanderson | June 10, 1924 |
| 1,762,510 | Edmonds | June 10, 1930 |
| 2,055,622 | Coleman | Sept. 29, 1936 |
| 2,641,628 | Jackson | June 9, 1953 |
| 2,671,127 | Hope | Mar. 2, 1954 |
| 2,673,233 | Salisbury | Mar. 23, 1954 |
| 2,688,651 | Blake | Sept. 7, 1954 |

FOREIGN PATENTS

| | | |
|---|---|---|
| 42,256 | Germany | Apr. 27, 1887 |
| 104,520 | Great Britain | Mar. 7, 1917 |
| 286,344 | Great Britain | Feb. 29, 1928 |
| 507,657 | Germany | Sept. 18, 1930 |
| 294,500 | Italy | Mar. 25, 1932 |
| 726,054 | France | May 23, 1932 |
| 572,466 | Germany | Mar. 16, 1933 |
| 647,335 | Great Britain | Dec. 13, 1950 |